DIVISION BY PRESELECTED DIVISOR

Filed Sept. 28, 1965 2 Sheets-Sheet 1

INVENTOR.
LOUIS M. HORNUNG
BY John A. Brady
ATTORNEY.

United States Patent Office 3,344,261

Patented Sept. 26, 1967

3,344,261

DIVISION BY PRESELECTED DIVISOR

Louis M. Hornung, Lexington, Ky., assignor to International Business Machines Corporation, Armonk, N.Y., a corporation of New York Filed Sept. 28, 1965, Ser. No. 490,895
15 Claims. (Cl. 235—160)

This invention relates to the machine division of one number by another. The invention is particularly useful for implementation of a division step in a radix conversion operation, but division for other purposes is also within the scope of this invention.

Division is a significant problem in the data processing art. Means to divide are known, of course, but the known means require a large, and consequently time consuming and structurally complicated, number of steps. For example, one common method of machine division is the same or a modification of the pencil and paper division used almost universally by individuals in this country. Such a division requires at least one complete subtraction of the divisor or a multiple of the divisor from some number for each significant ordinal of the quotient.

No division method is known in the prior art which reaches a quotient in a number of memory access cycles strictly limited to the number of ordinals in the quotient. It is an object of this invention to provide such a potentially high speed divider. Indeed, division can be accomplished in accordance with this invention in an interval of time approaching that required for the addition of two binary numbers by the fastest electronic mechanisms known today. It is a related object of this invention to provide an electronic data processing machine divider which is faster for the purpose used than any practical, known divider. It is a further related object of this invention to provide a divider which can be used to make possible high speed machine radix conversion.

The machine divider in accordance with this invention constitutes machine elements and parts permanently structured to divide by a preselected divisor. Dividers of this nature are known which are reasonably limited in extra structure required. This invention, however, also requires only a small amount of structure and structural complications, and the invention further provides the high speed capabilities discussed above. It is therefore a further object of this invention to provide a high speed divider as specified in which the structural requirements are not inordinate. The invention allows the use of structures which are both practical and economic.

In accordance with this invention means are provided to obtain a response condition based upon the status of certain high orders of the quotient and certain high orders of the dividend. No prior art is known which uses these two factors in any similar way. The value of a lower ordinal of the quotient is generated in accordance with the response condition. This new quotient ordinal is stored or preserved in some way for use in a second comparison of the same kind as the first comparison to generate another lower quotient ordinal. This repetitive sequence can be continued until the division is complete.

The divider in accordance with this invention is particularly useful with structures permanently built into a machine for division by a preselected factor. The invention is therefore particularly valuable for radix conversion such as the conversion of a natural bianry number to a number in radix ten by the known algorism of repetitively dividing by ten. (Division by ten can be partitioned into a division by two and a division by five, the former being merely a matter of a column shift, as is well konwn.) Division by a factor other than ten can be used to achieve a conversion to a different radix. Division for other ultimate purposes is also, of course, a part of the subject matter of this invention.

The foregoing and other objects, features and advantages of the invention will be apparent from the following more particular description of preferred embodiments of the invention, as illustrated in the accompany drawings.

THE PREFERRED OPERATION

In practicing this invention in this preferred system, in which a natural binary number is divided by five, it is required to have means capable of simultaneously supplying three ordinal values of the quotient and four ordinal values of the divisor. Most data processing equipments store these numbers, but do not provide for simultaneous access to these specific bits. Provision of such accessing means, however, is well within the state of the art.

If any specific, unknown quotient ordinal is arbitrarily denominated as $q_{(x)}$, then the quotient values which must be supplied in this preferred embodiment are: $q_{(x+1)}$ i.e., one ordinal higher $q_{(x+2)}$ i.e., two ordinals higher, and $q_{(x+3)}$ i.e., three ordinals higher. Using the same arbitrary definitions, the denominators which must be supplied are $d_{(x)}$; $d_{(x+1)}$; $d_{(x+2)}$; and $d_{(x+3)}$. Since both of these numbers are in the natural binary notation, each ordinal may have either a significance of one or a significance of zero.

Figure 2:
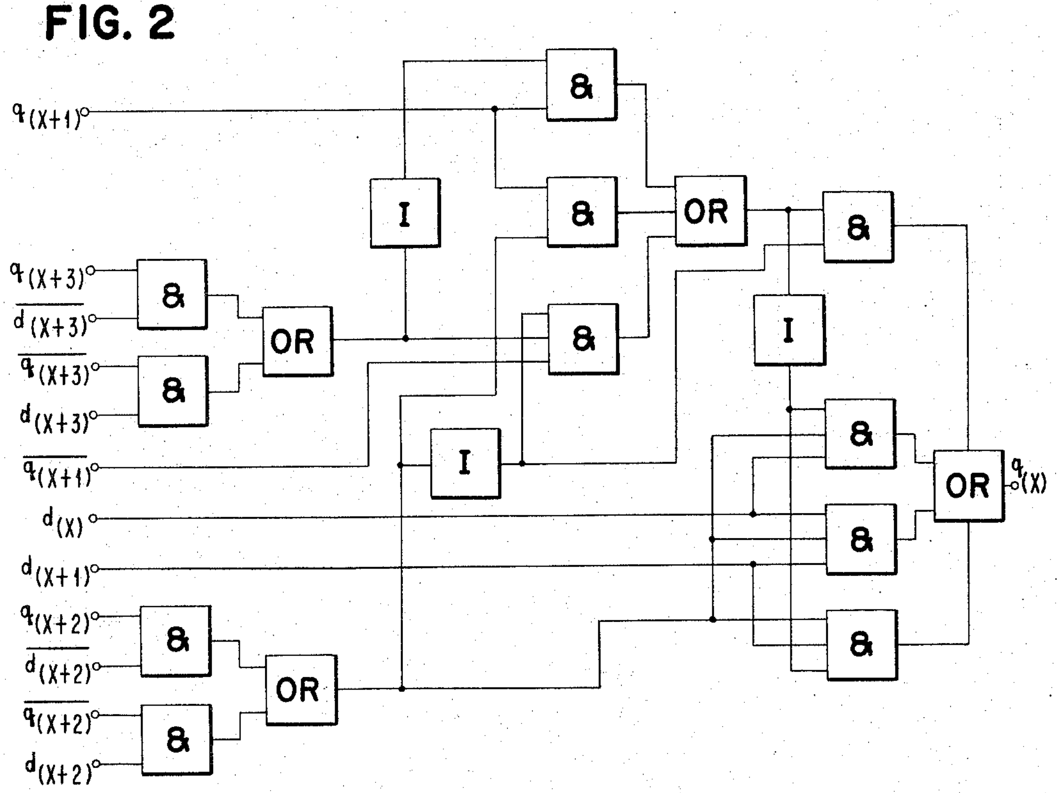
FIG. 2 illustrates the best known combination of logical elements used to determine one ordinal of the new quotient for division by five.

The following Karnaugh Map completely describes the results which should be generated in accordance with this preferred embodiment for all simultaneous examinations of the three quotient ordinals and the four dividend ordinals. The logic diagram illustrated in FIG. 2 will be recognized, upon careful study, as a good structural implementation of the Karnaugh Map. Although better implementations of the Karnaugh Map may be possible, FIG. 2 is believed at this time to be the best known.

The Karnaugh Map, of course, is simply a table which is well suited to locate the result which follows from seven variables. For those unfamiliar with such a table, an example will be detailed here.

KARNAUGH MAP OF $q_{(x)}$ IN THE SINGLE-CYCLE DIVISION BY FIVE $d_{(x+2)}$ $d_{(x)}$ $d_{(x)}$ $d_{(x)}$ $d_{(x)}$

| | | | | | | | | | | | | | | | |
|---|---|---|---|---|---|---|---|---|---|---|---|---|---|---|---|
| 0 | 0 | 0 | 0 | 1 | 1 | 1 | 0 | X | X | X | X | X | X | 1 | 1 |
| 1 | 1 | 1 | 1 | X | X | X | X | 0 | 0 | 1 | 0 | 0 | 0 | X | X |
| 0 | 0 | 1 | 0 | 1 | 1 | 1 | 1 | X | X | 0 | 0 | X | X | X | X |
| X | X | X | X | 0 | 0 | 0 | 0 | 1 | 1 | X | X | 1 | 1 | 1 | 0 |
| 0 | 1 | 1 | 1 | X | X | 1 | 1 | 0 | 0 | 0 | 0 | X | X | X | X |
| X | X | X | X | 0 | 0 | X | X | 1 | 1 | 1 | 1 | 0 | 1 | 0 | 0 |
| X | X | 0 | 0 | 0 | 1 | 0 | 0 | X | X | X | X | 1 | 1 | 1 | 1 |
| 1 | 1 | X | X | X | X | X | X | 0 | 1 | 1 | 1 | 0 | 0 | 0 | 0 |

$q_{(x+1)}$ $q_{(x+2)}$ $q_{(x+3)}$ $q_{(x+1)}$ $d_{(x+1)}$ $d_{(x+1)}$ $d_{(x+3)}$

*Example.*—Assuming $q_{(x+3)}=1$; $q_{(x+2)}=0$; $q_{(x+1)}=1$. $d_{(x+3)}=0$; $d_{(x+2)}=1$; $d_{(x+1)}=0$; $d_{(x)}=1$.

Ones and zeros values of the terms dictate whether the quantities inside or outside the brackets for the terms are to be considered on the map.

In using the map, the $q_{(x+3)}=1$ term means that the part of the map within the $q_{(x+3)}$ brackets is isolated. Thus, the bottom half of the map is isolated.

The $q_{(x+2)}=0$ term further isolates the map at those parts without the $q_{(x+2)}$ brackets. Thus, the first and second rows frow the bottom are isolated.

The $q_{(x+1)}=1$ term isolates only those rows within the $q_{(x+1)}$ brackets on the map. Thus, reference to the three "$q$" terms has isolated one, single row; and that row is the second from the bottom.

The "$d$" terms are further operative to isolate a single box in the isolated row.

Thus, the $d_{(x+3)}=0$ term isolates the left side of the map.

The $d_{(x+2)}=1$ term further isolates the four boxes of the map on the left from the center of the map.

The $d_{(x+1)}=0$ term further isolates those boxes which are without the $d_{(x+1)}$ brackets, in this case the two boxes immediately to the left of the center of the map.

The $d_{(x)}=1$ term finally isolates that single box which is defined by all the $d$ and $q$ terms by the isolations as above described. Since $d_{(x)}=1$, the box within the $d_{(x)}$ brackets is isolated. This is the seventh box from the left in the second row from the bottom (the row, of course, was isolated by the $q$ terms as above described).

One box on the map has been thus defined. The result is described by the contents of this box, zero in this case. (Boxes containing an X will never be isolated in a true division. The X is therefore just a filler for these boxes in the map.)

It should be understood, of course, that the Karnaugh Map is of primary value only for use in machine design and for use to explain this invention. In an actual machine the map is implemented by Boolean logic of the kind shown in FIG. 2. Electronic circuits of various kinds are known which can implement the logic of FIG. 2. Many conventional circuits implementing FIG. 2 are capable of resolving the quotient ordinal in a fraction of a microsecond, the only delay being the time required for the circuit to "settle" to the conditions forced upon the circuit by the simultaneous inputs to the circuit.

In carrying through a complete division, it is necessary, of course, to repeat the quotient ordinal determination for the several quotients generated, and to be able to access the lower ordinals of the dividend as needed.

ILLUSTRATIVE CYCLE

Purely as an example, the division by five of the natural binary number six will be detailed. The natural binary number six is stored in a machine as follows, assuming for purposes of illustration that the 8 ordinal is the highest ordinal stored in the machine.

| Ordinal Value: | 8 | 4 | 2 | 1 |
|---|---|---|---|---|
| Significance: | 0 | 1 | 1 | 0 |

The number is examined high order first, and, of course, the significance of each quotient ordinal is generated high order first. Since the highest ordinal in this simplified example is 8, the significance of the 8 ordinal of the dividend is first accessed. All registers containing input values to the divider should be cleared before the operation begins.

Figure 1:
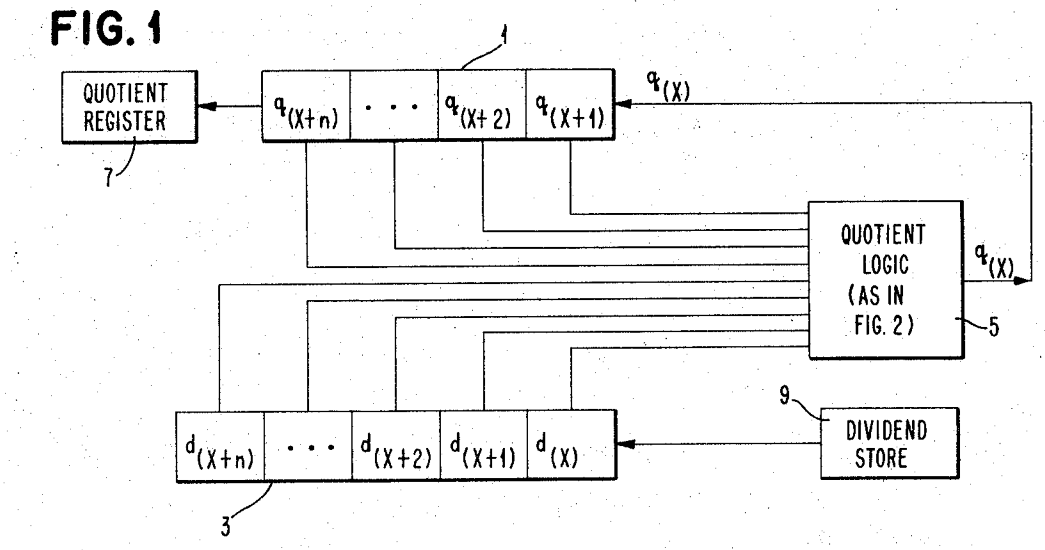
FIG. 1 illustrates a preferred system to divide a natural binary number in a machine by a preselected value such as five.

Thus, referring to FIG. 1, the partial quotient store 1 and the partial dividend store 3 each contain significances of zero, including the $d_{(x)}$ ordinal, which in this case is the 8 ordinal, which has a significance of zero. Reference to the map isolates the upper left hand box, which contains a zero; the same result is reached by the circuits of FIG. 2, as illustrated by the quotient logic 5 of FIG. 1. Thus, the significance of the 8 ordinal of the quotient is defined by the structures as zero.

The new quotient ordinal significance, zero in this case, is then shifted into the partial quotient store 1. The higher ordinals, zero at this time, are shifted into their respective next higher order positions of the quotient register 7 for more permanent storage and use in the machine. Simultaneously, the dividend is shifted into the partial dividend store 3 and the high orders in the store 3 are destroyed or possibly routed back into some machine storage for future use as needed. Since the original dividend value was six, it is necessarily implied that all ordinals below the binary point have a significance of zero. Therefore, simultaneously with the shift in the dividend a zero is inserted into the lowest stage of dividend store 9.

Immediately after the shift, which may be conducted in a few microseconds when solid state elements and toroidal magnetic memory cores are used, a new ordinal of the quotient may be computed. To accomplish this the quotient logic 5 is pulsed with the values stored in partial quotient store 1 and partial dividend store 3. In this case of division of six every value observed is zero except $d_{(x)}$, which has a significance of one. From FIG. 2 it will be clear that a value of zero will be generated by quotient logic 5. This can be verified by the map, in which the second box from the left in the top row is isolated. Thus, the significance of the quotient ordinal having the value 4 is determined to be zero. The shifts as above described are conducted once again.

With the shift completed the values of $q_{(x+3)}$; $q_{(x+2)}$; $q_{(x+1)}$ stored in partial quotient store 1 are once again all zero. The values in partial divisor store 3 are $d_{(x+3)}=0$; $d_{(x+2)}=0$; $d_{(x+1)}=1$; $d_{(x)}=1$. Quotient logic 5 is again made operative. Once again a zero is generated. With reference to the map, this zero is found in the top row, the third box from the left. Thus, the 2 ordinal of the quotient is computed as having a significance of zero.

Once again the values are shifted. After the shift, the values are as follows: $q_{(x+3)}=0$; $q_{(x+2)}=0$; $q_{(x+1)}=0$; $d_{(x+3)}=0$; $d_{(x+2)}=1$; $d_{(x+1)}=1$; $d_{(x)}=0$. The quotient logic 5 is pulsed, and a "one" is produced. This is verified by the map, the fifth box from the left of the top row is the one isolated. In this manner the "one" valued ordinal of the quotient is found to have a significance of one.

The shift is again conducted. After the shift, the values are as follows: $q_{(x+3)}=0$; $q_{(x+2)}=0$; $q_{(x+1)}=1$; $d_{(x+3)}=1$; $d_{(x+2)}=1$; $d_{(x+1)}=0$; $d_{(x)}=0$. The quotient logic 5 is pulsed, and a "zero" is produced. This is verified by the map, the ninth box from the left in the second row from the top being isolated. The value of the ½ ordinal of the quotient is thus found to have a significance of zero.

The shift is again conducted. After the shift, the values are as follows: $q_{(x+3)}=0$; $q_{(x+2)}=1$; $q_{(x+1)}=0$; $d_{(x+3)}=1$; $d_{(x+2)}=0$; $d_{(x+1)}=0$; $d_{(x)}=0$. The quotient logic 5 is pulsed, and a "zero" is produced. This is verified by the map, the sixteenth box from the left of the fourth row from the top being isolated. The value of the ¼ ordinal of the quotient is thus found to have a significance of zero.

The shift is again conducted. After the shift, the values are as follows: $q_{(x+3)}=1$; $q_{(x+2)}=0$; $q_{(x+1)}=0$; $d_{(x+3)}=0$; $d_{(x+2)}=0$; $d_{(x+1)}=0$; $d_{(x)}=0$. The quotient logic 5 is pulsed, and a "one" is produced. This is verified by the map, the first box from the left in the bottom row being the one isolated. The value of the ⅛ ordinal of the quotient is thus found to have a significance of one.

The shift is again conducted. After the shift, the values are as follows: $q_{(x+3)}=0$; $q_{(x+2)}=0$; $q_{(x+1)}=1$; $d_{(x+3)}=0$; $d_{(x+2)}=0$; $d_{(x+1)}=0$; $d_{(x)}=0$. The quotient logic 5 is pulsed, and a "one" is produced. This is verified by the map, the first box from the left in the second row from the top being the one isolated. The value of the 1/16 ordinal of the quotient is thus found to have a significance of one.

The above can be continued further and, theoretically, indefinately to produce the value below the binary point in a fractional expansion. It should be clear that the correct significance of each ordinal of the quotient is generated on one pass through the dividend high order first in a system which is basically capable of great speed. The structures involved are not complicated or expensive, being, as a matter of fact, comparable to that required in an adding-subtracting accumulator. It should be clear that the implementation need not be in a serially shifted memory as discussed for purposes of example in the above division of six by five. It is an important capability of this invention that it can be implemented using cascaded quotient logic structures, each as shown in FIG. 2 or modified as will be made clear below for division by some other divisor. The higher order quotient logic circuits will be connected as inputs to the lower order quotient logic circuits to the limited extent required by this invention. The entire dividend will be accessed simultaneously into the cascaded structures, also to the limited extent required by this invention. The entire quotient will thereby be generated at great speed in a single machine step in a parallel machine.

The above structures and steps are capable of explanation and expansion on theoretical grounds, and I have made these theoretical determinations.

THEORY—DIVISION BY FIVE

It was noted that the following is invariably true when the quotient is ⅕ of the divisor. [In the equations the $q$ values are the ordinals of the quotient, the $d$ values are the ordinals of the dividend, $x$ is a whole number used as subscript to mathematically define the continuous sequence of ordinals under consideration (thus, in natural binary the 8 ordinal could arbitrarily be defined as the $x$ ordinal, then the 16 ordinal is the $x+1$ ordinal), and the C values are carries from the addition of lesser ordinals.]

*Equation A*

$$\begin{array}{r} q_{(x+2)}2^{x+2}+q_{(x+1)}2^{x+1}+q_{(x)}2^{x} \\ +q_{(x)}2^{x+2}+q_{(x-1)}2^{x+1}+q_{(x-2)}2^{x} \\ +C_{(x)}2^{x} \\ \hline C_{(x+3)}2^{x+3}+d_{(x+2)}2^{x+2}+d_{(x+1)}2^{x+1}+d_{(x)}2^{x} \end{array}$$

Equation A is seen to be true by the following explanation. Representing the dividend by D and the quotient by Q, the division by five responds to the equality $$D=Q+4Q$$

As is well understood, a shift by two ordinal positions of any number described in the natural binary scheme of notation constitutes an automatic multiplication of that number by four. The ordinals of the quotient arranged in additive columns in Equation A are displaced by two ordinal positions ($x$ describes the ordinal sequence in Equation A). Thus, Equation A is verified since it is an implementation of the equation $D=Q+4Q$, in which certain portions are selected out of the body of the entire natural binary number descriptions for the values of D, Q, and 4Q, and the two ends of the quotients portions used in Equation A additionally contain the carry values possible in any addition. $C_{(x)}$ describes the total value of carries from the low orders and therefore completely describes the influence of low orders of Q and 4Q on the portions of those numbers selected for Equation A. The $C_{(x+3)}$ value completely describes the transfer of value to higher ordinals generated by the portions selected for Equation A.

With the above as one formula, two other equations were derived from theory of numbers.

$C_{(x+3)}$ was defined by the properties of addition, which inherently imply the following, which is an exhaustive logical analysis of all possible additions in an ordinal containing $C_{(x+3)}$ in the manner shown in Equation A. Assuming $q_{(x+3)}$; $q_{(x+1)}$ and $d_{(x+3)}$ are known, the following equations are written in standard Boolean terms where ⓧ means AND, + means OR, and overline means NOT: Thus, in standard Boolean fashion, $C_{(x+3)}=1$ when Equation B below is satisfied, otherwise the result is $\overline{C_{(x+3)}}$, which implies $C_{(x+3)}=0$.

*Equation B*

$$C_{(x+3)}=[\overline{d_{(x+3)}}\otimes q_{(x+1)}\otimes\overline{q_{(x+3)}}]+[\overline{d_{(x+3)}}\otimes\overline{q_{(x+1)}}\otimes q_{(x+3)}]+[d_{(x+3)}\otimes\overline{q_{(x+1)}}\otimes\overline{q_{(x+3)}}]+[d_{(x+3)}\otimes q_{(x+1)}q_{(x+3)}]$$

With Equation B thus established, it is recognized that Equation A above can be rewritten as a specific equality if the $2^x$ term is removed by the expedient of dividing every term of Equation A by $2^x$. Since Equation A is an algebraic equality, division of all terms by $2^x$ is, of course, proper. Therefore, the following is derived from Equation A.

*Equation C*

$$4q_{(x+2)}+2q_{(x+1)}+q_{(x)}+4q_{(x)}+2q_{(x-1)}+q_{(x-2)}+C_{(x)}=8C_{(x+3)}+4d_{(x+2)}+2d_{(x+1)}+d_{(x)}$$

Rearranging:

$$q_{(x)}=\tfrac{1}{5}[8C_{(x+3)}+4d_{(x+2)}+2d_{(x+1)}+d_{(x)}-4q_{(x+2)}-2q_{(x+1)}-2q_{(x-1)}-q_{(x-2)}-C_{(x)}]$$

The quantity $2q_{(x-1)}+q_{(x-2)}+C_{(x)}$ contains low ordinal values which, for the purposes of a division, should be viewed as unknown and not directly attainable. However, the sum of $2q_{(x-1)}+q_{(x-2)}+C_{(x)}$ is limited in magnitude since it results from two natural binary numbers. First, it is recognized that the significance of any ordinal of a natural binary number can be no greater than one. Second, it is recognized that a carry generated from adding only two such ordinals in accordance with Equation A can be no greater than one. Therefore, $2q_{(x-1)}\leq 2$, $q_{(x-2)}\leq 1$ and $C_{(x)}\leq 1$. Consequently, $$2q_{(x-1)}+q_{(x+2)}+C_{(x)}$$

must be equal to or less than four in value.

Separately and additionally, $q_{(x)}$ in Equation C is recognized as being either one or zero. Some different or intermediate value is not possible, assuming the quotient is being generated in natural binary notation and that the division responds, as it clearly must, to the usual limitations and theory of division. In consequence, the quantity inside the brackets in Equation C, since it is preceded by ⅕, invariably must be divisible by five.

With even divisibility by five established and with $2q_{(x-1)}+q_{(x-2)}+C_{(x)}$ known to be no greater than four, it is then established and recognized by inspection of Equation C that Equation C permits of solution dictated only by the $d$ values of $d_{(x)}$ and greater and by the $q$ values of $q_{(x+1)}$ and greater, assuming $C_{(x+3)}$ is known. The importance of Equation B then becomes evident since Equation B describes $C_{(x+3)}$ in terms of only the high order values. With this firm theoretical basis, the Karnaugh Map for division by 5 above shown was constructed by systematically inserting each possible combination into Equation B and Equation C so as to solve for $q_{(x)}$. Each value of $q_{(x)}$ thus obtained constituted the value to be inserted in the box defined by all of the variables on the map.

VARIOUS DIVISORS

This invention is useful to accomplish division with any divisor greater than one, although division by the smaller numbers is achieved with the use of by far the more simple and practical circuitry. The above proof must be further generalized to thereby prove that any quotient may be obtained.

First, assuming a division of a natural binary number by some generalized whole number divisor, an equality generalizing the equality of $D=Q+4Q$ for division by five may be written as follows:

*Equation D*

$$D=v_0\frac{D}{V}+v_1 2\frac{D}{V}+v_2 2^2\frac{D}{V}+\ \ldots\ +v_s 2^s\frac{D}{V}$$

where: D is the dividend, V is the divisor, $v_0$, $v_1$, $v_2$, $+\ \ldots\ v_s$ are each individually either one or zero as required by the value of V in order to render Equation D an algebraic equality, and $s$ is the highest significant ordinal of the expansion in Equation D.

The term $D/V$ is, of course, also the quotient, Q. Thus, Equation D may also be written as:

$$D=V_0Q+V_1 2Q+V_2 2^2Q+\ \ldots\ +V_s 2^sQ$$

The direct relationship to the equality $D=Q+4Q$, used in the proof for division by 5, becomes more evident.

Equation D is capable of specific implementation in virtually any form needed. Thus, in the case of a division by 9, Equation D would read $$D=\frac{D}{9}+\frac{8D}{9}$$

For a division by 10, Equation D would read $$D=\frac{2D}{10}+\frac{8D}{10}$$

Division of both sides of Equation D by D and multiplication of both sides of Equation D by V makes it clear that the $v$ terms ($v_0\ \ldots\ v_s$) are related to V as follows: $V=v_s2^s+\ \ldots\ v_22^2+v_12^2+v_12^1+v_02^0$. Equation D, however, is best considered at this time with reference to the theoretical proof of this invention. It should be evident from inspection of Equation D that Equation D is a general expression of a form representing any whole number value of V. An example in addition to those above establishing this would be for $V=11$, in which instance Equation D reads $$D=\frac{D}{11}+\frac{2D}{11}+\frac{8D}{11}$$

Therefore, in the manner of Equation A, with which the division by 5 was proved, a general additive equation can be written in which certain portions are selected out of the body of the entire natural binary number descriptions for the quotients. That equation is verified by the completely general Equation D. The completely general additive equation is the following Equation E:

*Equation E*

$$\begin{array}{lllll}
v_0q_{(x+s)}2^{x+s} & +v_0q_{(x+s-1)}2^{x+s-1}+ & \ldots & +v_0q_{(x+1)}2^{x+1} & +v_0q_{(x)}2^{x} \\
+v_1q_{(x+s-1)}2^{x+s} & +v_1q_{(x+s-2)}2^{x+s-1}+ & \ldots & +v_1q_{(x)}2^{x+1} & +v_1q_{(x-1)}2^{x} \\
+v_2q_{(x+s-2)}2^{x+s} & +v_2q_{(x+s-3)}2^{x+s-1}+ & \ldots & +v_2q_{(x-1)}2^{x+1} & +v_2q_{(x-2)}2^{x} \\
+\ \ \ldots & \quad + & \ldots & & +\ \ \ldots \\
+v_{(s-1)}q_{(x+1)}2^{x+s} & +v_{(s-1)}q_{(x)}2^{x+s-1}+ & \ldots & +v_{(s-1)}q_{(x-s+2)}2^{x+1} & +v_{(s-1)}q_{(x-s+1)}2^{x} \\
+v_sq_{(x)}2^{x+s} & +v_sq_{(x-1)}2^{x+s-1}\ + & \ldots & +v_sq_{(x-s+1)}2^{x+1} & +v_sq_{(x-s)}2^{x} \\
 & & & & +C_{(x)}2^{x} \\
\hline
C_{(x+s+1)}2^{x+s+1}+d_{(x+s)}2^{x+s} & +d_{(x+s-1)}2^{x+s-1}\ + & \ldots & +d_{(x+1)}2^{x+1} & +d_{(x)}2^{x}
\end{array}$$

Equation E is completely general. In a particular case each individual $v$ value may be one or zero. For division by 5, Equation A is a specific implementation of Equation E. For a division by 7, Equation E would appear as follows:

*Specific Equation E for division by 7*

$$\begin{array}{llll}
 & q_{(x+2)}2^{x+s} & +\ q_{(x+1)}2^{x+1} & +\ q_{(x)}2^{x} \\
 & +\ q_{(x+1)}2^{x+s} & +\ q_{(x)}2^{x+1} & +\ q_{(x-1)}2^{x} \\
 & +\ q_{(x)}2^{x+s} & +\ q_{(x-1)}2^{x+1} & +\ q_{(x-2)}2^{x} \\
 & & & +\ C_{(x)}2^{x} \\
\hline
C_{(x+3)}2^{x+3} & +\ d_{(x+2)}2^{x+2} & +\ d_{(x+1)}2^{x+1} & +\ d_{(x)}2^{x}
\end{array}$$

As in the manner of Equation B in the proof for division by 5, a general equation for the highest order carry in Equation E, $C_{(x+s+1)}2^{x+s+1}$, is required. That general equation can be obtained by consideration of only the addition columns including the column in which $C_{(x+s+1)}$ appears in an addition similar to that described by Equation E and also, as discussed below, a finite number of higher order addition columns. This approach is based upon the realization that all $q$ and $d$ values in those high ordinal columns will be known during the machine division.

The basic approach is to realize that if the $d$ value, i.e. $d_{(x+s+1)}$ is one, then an odd number of 1 values must exist for all of the $q$ values in the additive column if the carry has a significance of zero, and, conversely, an even number exists if carry significance is one. Similarly, if the $d$ value is zero, then an even number of 1 values must exist for all of the $q$ values in the additive column if the carry has a significance of zero, and, conversely, an odd number exists for a carry of one. In the general case herein under consideration a large number of possible numbers added increases greatly the number of relationships of factors which combine to describe $C_{(x+s+1)}$ in terms of the known high order values. A significant complication is that the significance of a carry in an addition of natural binary numbers added in the manner of Equation E may be between the values of zero and one less than the total of $v$ terms which have a significance of one. For example, one column in the middle of the addition of four binary numbers may produce a carry having any whole number value of 0, 1, 2, or 3.

Thus, Equation B was simplified because the carry could have a significance of only 1 or zero. In the more general case the carry $C_{(x+s+1)}$ should be considered to have possible significance of 1 not only in the next higher column of Equation E, but also in a number of higher columns, limited, however, by the fact that the carry can not be of a value greater than the $v_{total}-1$, where $v_{total}$ is the sum of $v$ terms having a significance of one.

Stated mathematically, the high order columns may be written as follows:

*Equation F*

$$\begin{array}{llll}
v_0q_{(x+s+t+1)}2^{x+s+t+1} & +v_0q_{(x+s+t)}2^{x+s+t} & +\dots & +v_0q_{(x+s+1)}2^{x+s+1} \\
+v_1q_{(x+s+t)}2^{x+s+t+1} & +v_1q_{(x+s+t-1)}2^{x+s+t} & +\dots & +v_1q_{(x+s)}2^{x+s+1} \\
+v_2q_{(x+s+t-1)}2^{x+s+t+1} & +v_2q_{(x+s+t-2)}2^{x+s+t} & +\dots & +v_2q_{(x+s-1)}2^{x+s+1} \\
+\quad\dots & +\quad\dots & + & \quad\dots \\
+v_{s-1}q_{(x+t+2)}2^{x+s+t+1} & +v_{s-1}q_{(x+t+1)}2^{x+s+t} & +\dots & +v_{s-1}q_{(x+2)}2^{x+s+1} \\
+v_sq_{(x+t+1)}2^{x+s+t+1} & +v_sq_{(x+t)}2^{x+s+t} & +\dots & +v_sq_{(x+1)}2^{x+s+1} \\
 & & & +C_{(x+s+1)}2^{x+s+1} \\
\hline
d_{(x+s+t+1)}2^{x+s+t+1} & +d_{(x+s+t)}2^{x+s+t} & +\dots & +d_{(x+s+1)}2^{x+s+1}
\end{array}$$

Since $C_{(x+s+1)}$ is known to be finite, it can be written in the natural binary form, $$C_{(x+s+1)}=b_t2^t+b_{t-1}2^{t-1}+\dots+b_0$$

Substitution of this natural binary form for $C_{(x+s+1)}$ in Equation F yields the following Equation G: The value of $t$ need be no larger than necessary to describe $$C_{(x+s+1)}2^{x+s+1}$$

*Equation G*

$$\begin{array}{llll}
v_0q_{(x+s+t+1}2^{x+s+t+1} & +v_0q_{(x+s+t)}2^{x+s+t} & +\dots & +v_0q_{(x+s+1)}2^{x+s+1} \\
+v_1q_{(x+s+t)}2^{x+s+t+1} & +v_1q_{(x+s+t-1)}2^{x+s+t} & +\dots & +v_1q_{(x+s)}2^{x+s+1} \\
+v_2q_{(x+s+t-1)}2^{x+s+t+1} & +v_2q_{(x+s+t-2)}2^{x+s+t} & +\dots & +v_2q_{(x+s-1)}2^{x+s+1} \\
+\quad\dots & +\quad\dots & + & \quad\dots \\
+v_{s-1}q_{(x+t+2)}2^{x+s+t+1} & +v_{s-1}q_{(x+t+1)}2^{x+s+t} & +\dots & +v_{s-1}q_{(x+2)}2^{x+s+1} \\
+v_sq_{(x+t+1)}2^{x+s+t+1} & +v_sq_{(x+t)}2^{x+s+t} & +\dots & +v_sq_{(x+1)}2^{x+s+1} \\
+b_t2^{x+s+t+1} & +b_{t-1}2^{x+s+t} & +\dots & +b_02^{x+s+1} \\
\hline
d_{(x+s+t+1)}2^{x+s+t+1} & +d_{(x+s+t)}2^{x+s+t} & +\dots & +d_{(x+s+1)}2^{x+s+1}
\end{array}$$

The significances of the $b$ values in Equation G are the only values assumed to be unknown, since the other values are high order. Furthermore, the $b$ values in Equation G are either one or zero, since the $b$ values represent the ordinal significance of a natural binary expression. Equation G is therefore capable of straightforward manipulation with the AND, OR logic of Boolean algebra. The following Equation H results, which, although more complicated, is entirely comparable to specific Equation B.

*Equation H*

$b_0=1$ when any combination of one significances of $v_0q_{(x+s+1)}$, $v_1q_{(x+s)}$, $v_2q_{(x+s-1)}$, . . . $v_{s-1}q_{(x+2)}$, and $v_{s-1}q_{(x+1)}$, is even and $d_{(x+s+1)}$ is one; or when any combination of the same $v$ values is odd and $d_{(x+s+1)}$ is zero. Otherwise, $b_0=0$.

$b_{t-1}=1$ when any combination of one significances of $v_0q_{(x+s+t)}$, $v_1q_{(x+s+t-1)}$, $v_2q_{(x+s+t-2)}$, . . . $v_{s-1}q_{(x+t+1)}$, and $v_sq_{(x+t)}$ and the one significance of any carries from all the lower stages beginning with the stage containing $b_0$ is even and $d_{(x+s+t)}$ is one; or when any combination of the same $v$ values and carry value is odd and $d_{(x+s+1)}$ is zero. Otherwise $b_{t-1}=0$.

$b_t=1$ when any combination of one significances of $v_0q_{(x+s+t+1)}$, $v_1q_{(x+s+t-1)}$, $v_2q_{(x+s+t-1)}$ . . . $v_{s-1}q_{(x+t+2)}$, and $v_sq_{(x+t+1)}$, and the one significance of any carries from all the lower stages beginning with the stage containing $b_0$ is even and $d_{(x+s+t+1)}$ is one; or when any combination of the same $v$ values is odd and $d_{(x+s+t+1)}$ is zero. Otherwise, $b_{t-1}=0$.

The above type of logic is also true, of course, for $b$ values intermediate between $b_0$ and $b_{t-1}$.

With Equation H established, it then becomes desirable to rewrite Equation E as a specific equality in the manner that Equation A was rewritten as Equation C is the proof for division by 5. By dividing both sides of the equality expressed by Equation E by $2^x$ and by straightforward algebraic manipulation of Equation E, the following Equation I is obtained:

*Equation I*

$$\begin{aligned}
q_{(x)}=\frac{1}{v_s2^s+v_{(s-1)}2^{s-1}+\dots+v_12^1+v_0}\,[&C_{(x+s+1)}2^{s+1}+d_{(x+s)}2^s+ \\
&d_{(x+s-1)}2^{s-1}+\dots+d_{(x+1)}2+d_{(x)} \\
&-v_0q_{(x+s)}2^s-v_0q_{(x+s-1)}2^{s-1}-\dots-v_0q_{(x+1)}2 \\
&-v_1q_{(x+s-1)}2^s-v_1q_{(x+s-2)}2^{s-1}-\dots-v_1q_{(x+1)}2^2 \\
&-v_2q_{(x+s-2)}2^s-v_2q_{(x-s-3)}2^{s-1}-\dots-v_2q_{(x+1)}2^3 \\
&-\dots \\
&-v_{(s-1)}q_{(x+1)}2^s \\
&-v_1q_{(x-1)}-v_2q_{(x-1)}2-v_2q_{(x-2)} \\
&-\dots-v_{(s-1)}q_{(x-s+2)}2-v_{(s-1)}q_{(x-s+1)} \\
&-v_sq_{(x-1)}2^{s-1}-\dots-v_sq_{(x-s+1)}2-v_sq_{(x-s)} \\
&-C_{(x)}]
\end{aligned}$$

Quantities in Equation I with ordinal values as low as $q_{(x-1)}$ and lower for the purposes of a division by machine should be viewed as unknown and not directly attainable. Also, $C_{(x)}$ for the purposes of division should be viewed as unknown and not directly attainable. The quantities were grouped at the end of the brackets in Equation I. They may be defined as a quantity $u$. Thus, Equation J follows:

*Equation J*

$$\begin{aligned}
u=&-v_1q_{(x-1)}-v_2q_{(x-1)}2-v_2q_{(x-2)} \\
&-\dots-v_{(s-1)}q_{(x-s+2)}2-v_{(s-1)}q_{(x-s+1)} \\
&-v_sq_{(x-1)}2^{s-1}-\dots-v_sq_{(x-s+1)}2-v_sq_{(x-s)} \\
&-C_{(x)}
\end{aligned}$$

As in the proof for division by 5, it is the maximum negative value of $u$ which is of interest, the minimum value, of course, clearly being zero. Therefore, all of the $q$ terms in Equation J can be assumed to be 1, and Equation J can be then rearranged by straightforward algebra to the following Equation K.

*Equation K*

$$u=-v_1-v_2[2+1]-\dots-v_{(s-1)}[\dots+2+1]-v_s[2^{s-1}+\dots+2+1]-C_{x_{max.}}$$

As discussed above the reference to $C_{(x+s+1)}$, a carry in an addition of several numbers may be as large as one less than the total of the numbers being added. Since it is intended to obtain a general expression for $u$ which represents the maximum value of $u$ and since each $v$ term can be one or zero, a general expression for the maximum value of $C_{(x)}$ is the following Equation L.

*Equation L*

$$C_{(x)}=v_s+v_{(s-1)}+\dots v_2+v_1+v_0-1$$

By replacing $C_{(x)}$ in Equation K with the value defined by Equation L, the following Equation M is obtained.

*Equation M*

$$\begin{aligned}
u_{max}=&-2v_1-v_2[2+1+1]-\dots \\
&-v_{(s-1)}[\dots+2+1+1] \\
&-v_s[2^{s-1}+\dots 2+1+1]v_0+1
\end{aligned}$$

Simplifying Equation M to the following Equation N:

*Equation N*

$$u_{max}=-v_12^1-v_22^2-\dots-v_{s-1}2^{s-1}-v_s2^s-v_0+1$$

With the maximum value of $u$ thus defined by Equation N, reference should once again be made to Equation I. The quantity outside the brackets is $$\frac{1}{v_s2^s+v_{(s-1)}2^{s-1}+\dots+v_12^1+v_0}$$

which is the reciprocal of the divisor V. As in the proof for division by 5, $q_{(x)}$ in Equation I is recognized as being either one or zero since some different or intermediate value is not possible under the circumstances of a quotient defined in natural binary notation. In consequence, the quantity inside the brackets, since it is preceded by the reciprocal of the divisor, invariably must be divisible by the divisor.

With even divisibility by $$v_s 2^s + v_{(s-1)} 2^{s-1} + \ldots + v_1 2^1 + v_0$$

established and with $u$ known (by Equation M) to be no greater than $-v_s 2^s - v_{(s-1)} 2^{s-1} - \ldots - v_1 2^1 - v_0 + 1$, it is established that Equation I permits of solution dictated only by the $d$ values of $d_{(x)}$ and greater than the $q$ values of $q_{(x+1)}$ and greater, assuming $C_{(x+s+1)}$ is known. This is true because $u_{max}$ is at least one less in absolute maximum value than the divisor which is the only term in the denominator in the right hand side of Equation I, and also because the right hand side of Equation I must be zero or one. Had the $u$ term, the term which includes every value assumed to be unknown, been possibly greater than or equal to V, then solution of Equation I would have been indeterminate since at least two $u$ values could be found which might satisfy the division by $1/V$ as described by the right hand side of Equation I. This is a more generalized statement of the same conclusion obtained in the specific case of the proof of a division by 5.

The following three Karnaugh Maps, one for division by 3, one for division by 7, and one for division by 9, were compiled on the basis of the above derivation. The contents of all the boxes in all the maps were obtained by methodical insertion of every possible high order $q$ value and $d$ value combination in Equation H and Equation I. The $v$ values were, of course, defined by the magnitude of V to satisfy Equation D.

Thus, for division by 3: $D=D/3+2D/3$. Therefore, $v_0=v_1=1$. Other $v$ terms$=0$. For division by 7: $D=D/7+2D/7+4D/7$. Therefore, $v_0=v_1=v_2=1$. Other $v$ terms $=0$. For division by 9: $D=D/9+8D/9$. Therefore, $v_0=v_3=1$. Other $v$ terms$=0$.

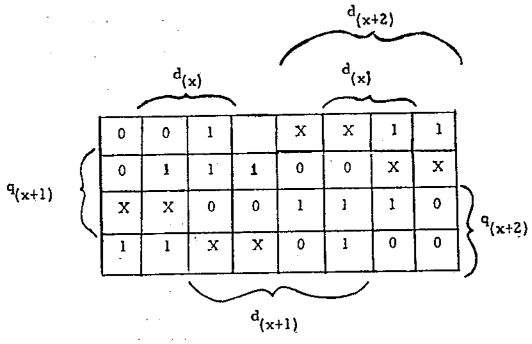

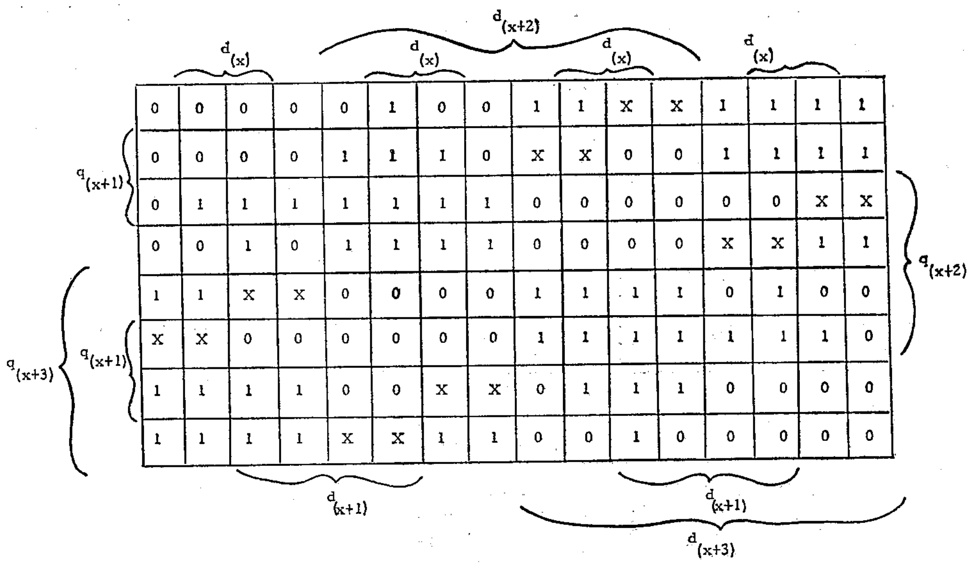

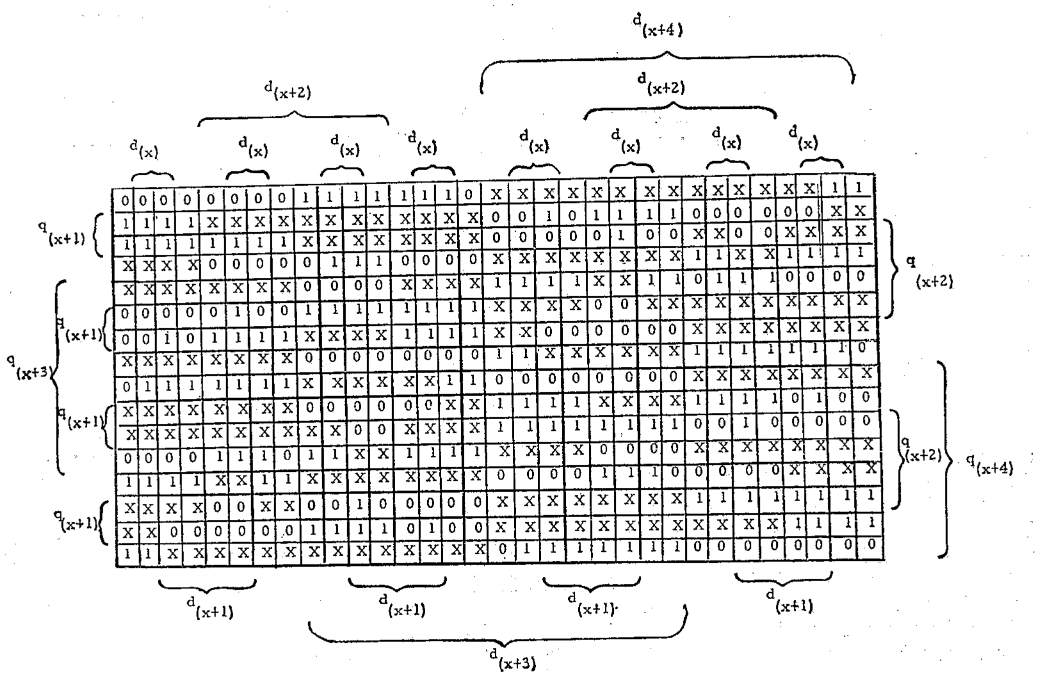

BINARY TO DECIMAL CONVERSION

A preferred utilization of this invention is a binary conversion system which I have invented. As is known, a division by ten of a natural binary number casts below the binary point a value representative of the lowest ordinal of the number in the decimal notation. Thus, division of a natural binary number by ten, observation of the remainder, and then division once again of the whole number quotient remaining is an attractive means of radix conversion, should the practical problem of division be solved. Since this invention provides a practical, economic, and high speed divider, radix conversion is immediately available.

Figures 3, 4:
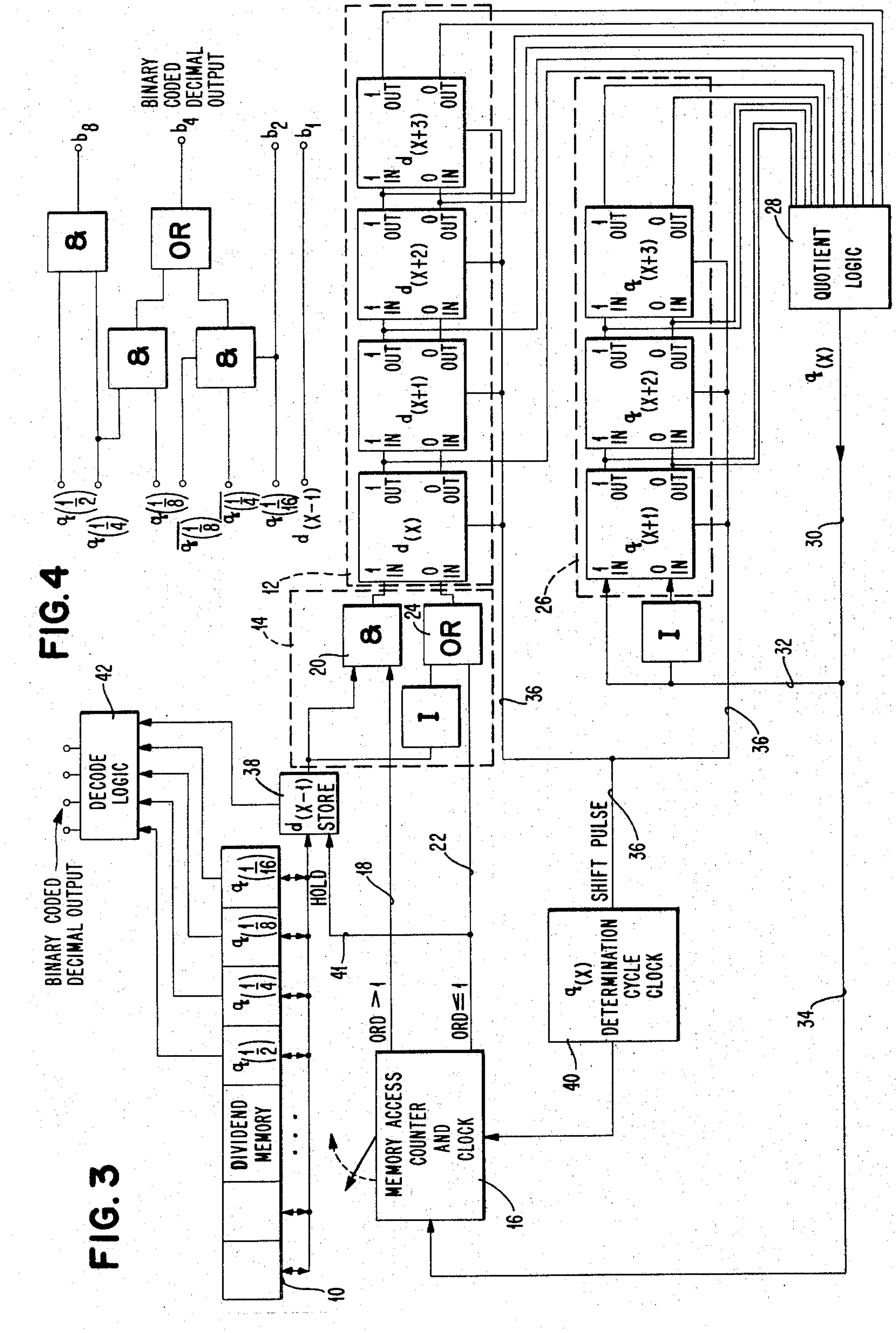
FIG. 3 illustrates a preferred system for radix conversion.
FIG. 4 illustrates the preferred decode logic for use with FIG. 3.

In a preferred natural binary to decimal radix conversion scheme, two shift registers are employed in the manner of FIG. 3. The division is by 5 rather than directly by 10 since the result can be interpreted as a division by ten as described below.

As shown in FIG. 3 a main memory and two shift registers are contemplated for use in this preferred radix conversion system. The preferred system includes a dividend memory 10, dividend shift register 12, and memory to shift register transfer circuits 14. Memory 10 is accessed under the control of a counter and clock 16 in a manner entirely conventional in the data processing art. Logic is provided so as to produce a unique signal when the count shows the ordinal of a number accessed in the memory 10 to be an ordinal greater in value than the one ordinal. This output is connected through conductive lead 18 to AND circuit 20. In the same manner a signal indicative of the ordinal value being equal to or less than one is connected through conductive lead 22 to OR circuit 24.

Shift register 26 is provided for the high order quotient bits. The quotient bit $q_{(x)}$ is generated in Quotient Logic 28 which is as described in detail above in accordance with this invention for the division by five. An output signal of one polarity is produced on line 30 as the output of quotient logic 28 when $q_{(x)}$ is "1." When $q_{(x)}$ is zero, a signal of opposite polarity is produced. Line 30 branches into line 32, which is an input of the usual kind to shift register 26. The subsequent division of the whole number quotient of a division by 10 is necessary to continue the radix conversion based on the repetitive division by ten algorism above discussed. Therefore, line 34 is connected to convey each quotient bit through memory access circuit 16 to dividend memory 10.

Thus, in this preferred embodiment two shift registers are employed. The shift register 12 stores the bits $d_{(x)}$, $d_{(x+1)}$, $d_{(x+2)}$, and $d_{(x+3)}$ of the dividend while the shift register 26 stores the bits $q_{(x+1)}$, $q_{(x+2)}$, and $q_{(x+3)}$. The outputs of both shift registers 12 and 26 are pulsed into quotient logic 28, and quotient logic 28 then produces an output on line 30 indicative of the one or zero status of $q_{(x)}$. At the start of one $q_{(x)}$ determination cycle, the next lower dividend bit, $d_{(x-1)}$ is read from dividend memory 10 stored in a one bit register 38.

A $q_{(x)}$ determination cycle may be considered to begin with the reading of $d_{(x-1)}$ from memory 10 into register 38 and the simultaneous pulsing of quotient logic 28 with the output from shift registers 12 and 26. In only a few microseconds, quotient logic 28 will be settled. A conventional source of timing and clock pulses 40 is provided to automatically initiate a shift pulse on line 36 and to open memory access circuit 16 to thereby read $q_{(x)}$ into the dividend memory stage which formerly held $d_{(x-1)}$. The shift pulse also causes the reading of $d_{(x-1)}$ from store 38 into the first stage of shift register 12. The higher order $d$ bits are advanced one stage and the former $d_{(x+3)}$ bit is automatically destroyed. The shift pulse on line 36 also causes the $q_{(x)}$ generated to be read from line 32 into the first stage of shift register 26. The higher order $q$ bits are advanced one stage and the former data in the $q_{(x+3)}$ stage is automatically destroyed.

Completion of the shifts initiated by one shift pulse can be considered to terminate one $q_{(x)}$ determination cycle. The counter in memory access circuit 16 is advanced one step during the completion of the shifts. A new $q_{(x)}$ determination cycle follows immediately. The memory access circuit 16 then reads the bit of the next lower ordinal of the dividend into the $d_{(x-1)}$ store 38 as a part of the next $q_{(x)}$ determination cycle.

The reading of each $q_{(x)}$ into the stage of dividend memory 10 which held $d_{(x-1)}$ for that cycle effectively shifts the $q_{(x)}$ down one ordinal. This is a particular improvement and efficiency of this preferred radix conversion scheme. As is known, a one ordinal shift right accomplishes a division by 2. Since $q_{(x)}$ is already representative of a division by 5, the quantity inserted in dividend memory 10 is representative of one tenth of the prior dividend. The whole number quotient of one tenth of the prior dividend is needed since it is to be divided again in order to continue the radix conversion as above discussed.

RADIX CONVERSION-DECODING

The division as illustrated in FIG. 3 is continued beyond the binary point, since it is the remainder which describes the result of a conversion to one ordinal in the decimal notation. As described below, unique means are provided so that the division need only be continued to three ordinals beyond the binary point of the original dividend in order to generate sufficient quotient bits to unambiguously describe the remainder as either 1, 2, 3, 4, 5, 6, 7, 8, 9, or 0. In accordance with this invention the decode logic to determine the decimal value produced is thereby simplified.

As a part of this simplication, the bit in the lowest whole number ordinal (the 1 ordinal) of the dividend is not operated upon during the division. That value is stored in $d_{(x-1)}$ store 38. At the 1 valued ordinal time and at the lower ordinal times the counter of circuit 16 automatically ceases producing an ord $>1$ signal on line 18. AND 20 will not then produce an output since line 18 does not carry one of the two inputs required by AND 20. Simultaneously, the counter of circuit 16 automatically produces an ord $\leq 1$ signal on line 22, and "zeroes" are thereafter automatically read into shift register 12. The signal on line 41 prevents store 38 from being cleared during the three $q_{(x)}$ determination cycles which follow.

The significance of the ord $=1$ ordinal is stored in circuit 38, but a zero is automatically inserted as the significance of the ord $=1$ ordinal. It will be proved here that these manipulations do, in fact, preserve an unambiguous modification of the quotient below the binary point in a division by ten, and that the whole number quotient obtained is the same as that of a pure division by 10. This is based upon the following equality, which results inherently from the limitations of division.

*Equation O*

$$\frac{D}{V}=D\left(\frac{1}{V_1}\right)\left(\frac{1}{V_2}\right)\cdots\left(\frac{1}{V_n}\right)=Q_{D/V}+\frac{R_{D/V}}{V}$$

where, $D$=dividend $V$=divisor $$\left(\frac{1}{V_1}\right)\left(\frac{1}{V_2}\right)\cdots\left(\frac{1}{V_n}\right)=\frac{1}{V}$$

$Q_{D/V}$=whole number quotient $\frac{R_{D/V}}{V}$=whole number remainder divided by V Also, of course, $R_{D/V}$=whole number remainder from D divided by V.

This notation will be adhered to in the following discussion. Thus, R will always represent a whole number remainder and Q will always represent the whole number portion of a quotient. A subscript to any result, such as Q or R will indicate what operation produced the result. Thus, $Q_{D/5}$ indicates the whole number quotient from dividing D by 5; and $R_{D/2}$ indicates the whole number remainder from dividing D by 2. These values may be further divided. Thus, $$\frac{Q_{D/5}}{2}$$

indicates that the whole number quotient from dividing D by 5 is divided by 2.

The following Equation P is known directly from the definitions of division and of the terms used:

*Equation P*

$$\frac{D}{10}=Q_{D/10}+\frac{R_{D/10}}{10}$$

In the preferred radix conversion system in accordance with this invention, the lowest ordinal of D described in natural binary notation is made "zero," even though it may originally be "one" or "zero." Since it is well known that a one ordinal shift right of a natural binary number accomplishes a division by two, the lowest ordinal can be immediately recognized as describing the whole number remainder of dividing D by two. In fact, therefore, it is $D-R_{D/2}$ which is first divided by 5 in accordance with this preferred embodiment. Both the whole number quotient and fraction parts of the quotient are obtained. This is described mathematically as follows:

$$(1)\quad \frac{D-R_{D/2}}{5}=Q_{\left[\frac{D-R_{D/2}}{5}\right]}+\frac{R_{\left[\frac{D-R_{D/2}}{5}\right]}}{5}$$

In the structural implementation, after the Equation 1 is carried out, a subsequent division by two is accomplished as the quotient bits which are generated are read into dividend memory 10 in bit positions shifted one ordinal toward the lower ordinals.

Stated mathematically, this is equivalent to multiplying both sides of Equation 1 by ½. Thus, $$(2)\quad \left[\frac{D-R_{D/2}}{5}\right]\left[\frac{1}{2}\right]=\left\{Q_{\left[\frac{D-R_{D/2}}{5}\right]}+\frac{R_{\left[\frac{D-R_{D/2}}{5}\right]}}{5}\right\}\left[\frac{1}{2}\right]$$

This equation may be simplified by straightforward algebra, it being recognized that division of $$Q_{\left[\frac{D-R_{D/2}}{5}\right]}$$

by two may create a new whole number remainder. Thus, simplifying (2) above, $$(3)\quad \frac{D}{10}-\frac{R_{D/2}}{10}=Q_{\frac{Q_{\left[\frac{D-R_{D/2}}{5}\right]}}{2}}+\frac{R_{\frac{Q_{\left[\frac{D-R_{D/2}}{5}\right]}}{2}}}{2}+\frac{R_{\left[\frac{D-R_{D/2}}{5}\right]}}{10}$$

In accordance with the notation discussed above $$Q_{\frac{Q_{\left[\frac{D-R_{D/2}}{5}\right]}}{2}}$$

is the whole number quotient obtained from dividing by 2 the whole number quotient produced by dividing $D-R_{D/2}$ by 5.

$$\frac{R_{\frac{Q_{\left[\frac{D-R_{D/2}}{5}\right]}}{2}}}{2}$$

is the whole number remainder divided by 2 obtained from dividing by 2 the whole number quotient produced by dividing $D-R_{D/2}$ by 5.

Equation 3 may be further simplified into the following Equation 4, completely by straightforward algebra:

$$(4)\quad \frac{D}{10}=Q_{\frac{Q_{\left[\frac{D-R_{D/2}}{5}\right]}}{2}}+\frac{5R_{\frac{Q_{\left[\frac{D-R_{D/2}}{5}\right]}}{2}}+R_{\left[\frac{D-R_{D/2}}{5}\right]}+R_{D/2}}{10}$$

It is now recognized that Equation 4 will be shown to be identical in form to Equation P if the fractional portion, $$\frac{5R_{\frac{Q_{\left[\frac{D-R_{D/2}}{5}\right]}}{2}}+R_{\left[\frac{D-R_{D/2}}{5}\right]}+R_{D/2}}{10}$$

cannot be greater than 1. Should that fraction portion possibly be greater than one in any case, however, the $$Q_{\frac{Q_{\left[\frac{D-R_{D/2}}{5}\right]}}{2}}$$

term would then not represent the true whole number quotient term obtained in every case. If it can be shown that the value $$5R_{\frac{Q_{\left[\frac{D-R_{D/2}}{5}\right]}}{2}}+R_{\left[\frac{D-R_{D/2}}{5}\right]}+R_{D/2}$$

cannot be ten in value or greater, then the fractional term of Equation 4 cannot equal a whole number. The identity in form between Equation P and Equation 4 establishes mathematically that the whole number terms in the two equations can be equated and that the fractional terms in the two equations can be established. Thus, it will be possible to write the following:

$$(5)\quad Q_{D/10}=Q_{\frac{Q_{\left[\frac{D-R_{D/2}}{5}\right]}}{2}}$$

and $$(6)\quad R_{D/10}=5R_{\frac{Q_{\left[\frac{D-R_{D/2}}{5}\right]}}{2}}+R_{\left[\frac{D-R_{D/2}}{5}\right]}+R_{D/2}$$

Equations 5 and 6 are established by the following, which proves that $$5R_{\frac{Q_{\left[\frac{D-R_{D/2}}{5}\right]}}{2}}+R_{\left[\frac{D-R_{D/2}}{5}\right]}+R_{D/2}$$

cannot be ten in value or greater.

First, it is recognized that the maximum theoretically possible value of the above sum of whole number remainders is 10. This is true because both $$R_{\frac{Q_{\left[\frac{D-R_{D/2}}{5}\right]}}{2}}$$

and $R_{D/2}$ were produced from divisions by 2. The maximum whole number remainer from division by 2, is of course 1. Also, $$R_{\left[\frac{D-R_{D/2}}{5}\right]}$$

is the whole number remainder produced from a division by 5. The maximum whole number remainder from division by 5 is, of course, 4. Thus the theoretically maximum value of $$5R_{\frac{Q_{\left[\frac{D-R_{D/2}}{5}\right]}}{2}}+R_{\left[\frac{D-R_{D/2}}{5}\right]}+R_{D/2}$$

is shown by inserting the above terms, to be $$5(1)+4+1=10$$

The true maximum value can be shown to be less than this, however.

Assume that $$\frac{R_{Q\left[\frac{D-R_{D/2}}{5}\right]}}{2}$$

is the maximum value possible for that remainder, which maximum value is 1. If this is true, then $$Q_{\left[\frac{D-R_{D/2}}{5}\right]}$$

was an odd number, since only odd numbers produce a remainder when divided by two.

Also, $$Q_{\left[\frac{D-R_{D/2}}{5}\right]}$$

is the whole number quotient from dividing $D-R_{D/2}$ by 5. $D-R_{D/2}$ must be an even number since $R_{D/2}$ will be one and will be subtracted away should D be an odd number. Since $$R_{\left[\frac{D-R_{D/2}}{5}\right]} \text{ along with } Q_{\left[\frac{D-R_{D/2}}{5}\right]}$$

was obtained by dividing $D-R_{D/2}$ by 5. It can be immediately stated that $$R_{\left[\frac{D-R_{D/2}}{5}\right]}=D-R_{D/2}-5Q_{\left[\frac{D-R_{D/2}}{5}\right]}$$

Since $$Q_{\left[\frac{D-R_{D/2}}{5}\right]}$$

was established above as being an odd number, then $$5Q_{\left[\frac{D-R_{D/2}}{5}\right]}$$

is odd because an odd number multiplied by an odd number is invariably an odd number.

The equation, $$R_{\left[\frac{D-R_{D/2}}{5}\right]}=D-R_{D/2}-5Q_{\left[\frac{D-R_{D/2}}{5}\right]}$$

can therefore be written $$R_{\left[\frac{D-R_{D/2}}{5}\right]}=\text{Even Number}-\text{Odd Number}$$

An even number less an odd number is invariably an odd number. Thus, when $$\frac{R_{Q\left[\frac{D-R_{D/2}}{5}\right]}}{2}$$

is 1 in value, $$R_{\left[\frac{D-R_{D/2}}{5}\right]}$$

must be odd. Since the maximum value of $$R_{\left[\frac{D-R_{D/2}}{5}\right]}$$

is 4, an even number, it is established that the three whole number remainders:

$$\frac{R_{Q\left[\frac{D-R_{D/2}}{5}\right]}}{2},\ R_{\left[\frac{D-R_{D/2}}{5}\right]}$$

$R_{D/2}$ can never simultaneously be their maximum theoretical value. Since their maximum theoretical value is ten or less it is established that the fractional value in Equation 4 is less than one. Thus, Equation P and Equation 4 identical in form, and Equations 5 and 6 are proved.

Equation 5 establishes that the number inserted in dividend memory 10 is identical to the whole number quotient obtained in a standard division of D by 10. This establishes that the radix conversion as described and as fundamentally based upon repetitive division by ten of the whole number quotient of $D/10$ can be properly carried out with the structures provided. Equation 6 is a proof that the whole number value below the binary point ($R_{D/10}$) in a division of D by 10 is entirely described by the values appearing below the binary point in a division of D by 5 in which the significance of the ordinal one above the binary point is transposed to zero for the division, but in which independent knowledge of the significance of the ordinal immediately above the binary point is preserved. In other words, it is only necessary to know the significance of the lowest whole number ordinal of D and the significances of the ordinals of the quotient below the binary point.

With the above proof completed, it becomes of importance to determine the number of quotient ordinals which must be known to describe the remainder unambiguously in a radix conversion. Remainders in a division by ten of a natural binary whole number must be integrals of 0 through 9. Division does not change the relative magnitudes of values in the original number, but merely reduces all magnitudes by the value of the divisor. Therefore, a binary "one" significance of the 1 valued ordinal of a natural binary number divided by ten will have a contribution in the final quotient of one-tenth. A binary one in the next higher ordinal will have a contribution in the final resulting totalling 2/10, a binary one in the next higher ordinal will have a significance in the final result totalling 4/10, and a binary one in the next higher ordinal will have a significance in the final result totalling 8/10. It is immediately apparent that only the binary one ordinal contributes a value of one to the total possible values of 0–9.

Since a binary code decimal (BCD) digit is desired to be decoded out of the system in accordance with this preferred embodiment, the value of preserving the digit in the binary one ordinal becomes apparent. This digit can be directly observed as the one ordinal output in the BCD output decode. As will be fully clarified below, the preservation of the significance of the 1 valued ordinal is so used.

As is well understood, the remainder in a binary division appears as a diminishing series in which each ordinal has a value which is a sequence of negative, whole number powers of two and in which each ordinal may have a significance of one or zero. (For example:

| | | | | | | | |
|---|---|---|---|---|---|---|---|
| Ordinal Value | $\frac{1}{2}$, | $\frac{1}{4}$, | $\frac{1}{8}$, | $\frac{1}{16}$, | $\frac{1}{32}$ | . . . | $\frac{1}{2^n}$ |
| Significance | 1 | 0 | 0 | 1 | 0 | . . . | |

is typical). Since a whole number will be divided by ten, the whole number $R_{D/10}$ must be either 1, 2, 3, 4, 5, 6, 7, 8, 9, 0. The lower valued ordinals are not required, however, to achieve differentiation between these ten discrete values which are known to exist.

In this radix conversion scheme a whole number which is comparable to $D-R_{D/2}$ in Equation 1 in the above derivation is divided by 5. Since the dividend is a whole number, the high order values below the binary point must be representative of one of the possible remainders, which are 0, 1, 2, 3, 4. The following table tabulates the four ordinals below the binary point for the 5 possibilities.

CONVERSION TO WHOLE NUMBER REMAINDER FROM QUOTIENT BELOW THE BINARY POINT PRODUCED BY DIVISION BY 5

| Quotient | | | | |
|---|---|---|---|---|
| Ordinal Value | | | | Remainder |
| 1/16 | 1/8 | 1/4 | 1/2 | |
| 0 | 0 | 0 | 0 | 0 |
| 1 | 1 | 0 | 0 | 1 |
| 0 | 1 | 1 | 0 | 2 |
| 1 | 0 | 0 | 1 | 3 |
| 0 | 0 | 1 | 1 | 4 |

It will be noted that the numbers are described uniquely by only the first three ordinals. The last ordinal is therefore shown not to be necessary to resolve any ambiguity.

It is thus established that only the three ordinals of $q$ immediately below the binary point are needed to describe the remainder in a division of a whole number by five. Equation 6 established that the remainder from a division of D by ten is described by the significance of the one valued ordinal in $Q_{D/5}$ (which is equal to $$\frac{R_{Q\left[\frac{D-R_{D/2}}{5}\right]}}{2}\text{), by } R_{\left[\frac{D-R_{D/2}}{5}\right]}$$

and by the significance of the original 1 valued ordinal of D (which is $R_{D/2}$). Therefore, a methodical compilation was made to include all of the five possible combinations of the three highest ordinals immediately below the binary point resulting from a division by five as compared with the two possible values of the one valued ordinal of the original number (D) and one valued ordinal in a quotient from division by 5 to thereby determine what the remainder must be in each case. The compilation was obtained by merely assuming ten different natural binary numbers each of which ended with a different of the ten numbers available in decimal: i.e., XX1, XX2, XX3, . . . XX0. The number was described in natural binary notation, and the significance of the lowest ordinal was noted. The number with a zero then inserted in the lowest ordinal was then divided by 5. The resulting significance of the one valued ordinal of the quotient plus the significances of the three ordinals of the quotient below the binary point were simply recorded, since these figures constituted one result in the following table.

DECODE TABLE
(Division by 5 of $D-R_{D/2}$)

| Quotient | | | | 1 Valued Ordinal of D | Decimal Value Represented |
|---|---|---|---|---|---|
| Ordinal Value | | | | | |
| 1/8 | 1/4 | 1/2 | 1 | | |
| 0 | 0 | 0 | 0 | 0 | 0 |
| 0 | 0 | 0 | 0 | 1 | 1 |
| 1 | 1 | 0 | 0 | 0 | 2 |
| 1 | 1 | 0 | 0 | 1 | 3 |
| 0 | 1 | 1 | 0 | 0 | 4 |
| 0 | 1 | 1 | 0 | 1 | 5 |
| 1 | 0 | 0 | 1 | 0 | 6 |
| 1 | 0 | 0 | 1 | 1 | 7 |
| 0 | 0 | 1 | 1 | 0 | 8 |
| 0 | 0 | 1 | 1 | 1 | 9 |

This decode table was used directly to achieve the decode logic 42 of FIG. 3, which is fully illustrated in FIG. 4. It is apparent from the decode table that the significances of only two ordinals below the binary point in the division by 5 are required. However, the use of a third ordinal beneficially simplifies the decode logic structure as illustrated in FIG. 4.

The decode logic 42 connects with the $d_{(x-1)}$ store register 38 and with the $q_{(1/2)}$, $q_{(1/4)}$, $q_{(1/8)}$, and $q_{(1/16)}$ ordinal registers of memory 10. Since in the actual implementation of radix conversion as illustrated in FIG. 3 a one ordinal shift is made to achieve a division by 10, $q_{(1/2)}$ is equivalent to the 1 valued ordinal in the above decode table, while $q_{(1/4)}$, $q_{(1/8)}$ and $q_{(1/16)}$, are equivalent to the ½, ¼, and ⅛ valued ordinals of the above decode table. Division is complete for the purposes of radix conversion when a quotient has been obtained which includes the ⅛ valued ordinal in the division by 5, and this is shifted one ordinal and is stored as the 1/16 valued ordinal. At this time, therefore, the proper bit stores are directly accessed into decode logic 42, as illustrated in FIG. 4. A binary coded decimal output is obtained immediately and may be used in the machine in any manner desired. Often it will be used ultimately to activate a printer to thereby print the number in decimal form.

It should be understood that the decode logic 42 is shown in FIG. 3 being driven from memory 10 only for purposes of clarity and as an alternative. It is actually preferred for most applications to omit any stages in dividend memory 10 representative of fractional ordinal values. Four low order quotient bits would be generated as above described, but they would not be stored in memory 10. Instead, use is made of the fact that $q_{(1/2)}$, $q_{(1/4)}$, and $q_{(1/8)}$ are represented by the stages of shift register 26 at the time $q_{(1/16)}$ is generated on line 30 from logic 28. Thus, line 30, and the output from the three stages of shift register 26, and the output from $d_{(x-1)}$ store 38 is gated into quotient logic 42 at the proper cycle, and the proper output is obtained without providing stages in dividend memory 10 to store fractional quotient bits.

TERMINOLOGY AND NUMBER SYSTEM

For a more complete understanding of the full scope of this invention, discussion will be made concerning the ordinal values of a whole number described in any accumulative, carry transfer scheme of notation. The natural binary numbering system is an accumulative, carry transfer scheme of notation.

Thus, the ordinal values in a natural binary system are: 1, 2, 4, 8, 16, 32, . . . $2^n$. When a number is described in natural binary notation, some of the ordinal values carry "zero" significance while the other ordinal values carry a "one." This is well known. Only the ordinal values which carry a one contribute to the final number. For example, the number 154 is described as:

| | | | | | | | | |
|---|---|---|---|---|---|---|---|---|
| Ordinal Value | 1 | 2 | 4 | 8 | 16 | 32 | 64 | 128 |
| Number Descriptors | 0 | 1 | 0 | 1 | 1 | 0 | 0 | 1 |

The number total is a simple addition of the ordinal values of the number descriptors having "one" significance, in this case:

$$128+16+8+2=154$$

It will be noted further that each number descriptor has an independent significance related directly to the ordinal value in which it appears. Thus, in natural binary notation, when a "one" number descriptor appears in the 128 ordinal, the final number is established as being at least 128 in value. The presence of a "one" number descriptor in some other ordinal defines numbers to be added to the value 128. The presence of a "zero" number descriptor indicates that no addition is to be made. The bare existence of the "one" in the 128 ordinal is thus seen to define a subtotal which is a part of the final number, regardless of the other number descriptors; this characteristic may be thought of as the accumulative characteristic of the numbering system.

A second characteristic is the carry transfer characteristic of the numbering system. This characteristic requires that all subordinate ordinals represent an amount which differs by one from the next dominate ordinal. Thus, in the natural binary system, the subordinate ordinals 1, 2, and 4 total one less than the next dominate ordinal, 8. Physically, this means in counting that the low ordinals are filled and that the dominant ordinal is filled from a carry from the subordinate ordinals.

The accumulative, carry transfer progression of number values is, in fact, the classical and often useful method of number notation. The decimal system responds to the same limitations. Thus, the number 58,024 is written as follows in decimal notation:

| Ordinal Value | 1 | 10 | 100 | 1,000 | 10,000 |
|---|---|---|---|---|---|
| Number Descriptors | 4 | 2 | 0 | 8 | 5 |

In this case the first number descriptor, 4, establishes that the final number contains four parts of the ordinal value, which is 1. This is true regardless of the other number descriptors. Similarly, in the above example, the 8 establishes that at least eight 1,000's exist in the number, regardless of the other number descriptors. Furthermore, the decimal system has the carry transfer characteristic. Thus, 999 is written in the first three ordinals while 999+1 is written as 1,000.

In any accumulative, carry transfer system of notation, a column shift represents a multiplication by the radix of the number, and furthermore all carries have "one" significance to the next higher ordinal. Thus, since any dividend can be expressed as multiples of the quotient in the manner of Equation E, this invention is applicable for machine division of any number stored in the accumulative, carry transfer system of notation.

While the invention has been particularly shown and described with reference to preferred embodiments thereof, it will be understood by those skilled in the art that various changes in form and details may be made therein without departing from the spirit and scope of the invention.

I claim:

1. A divider for a dividend represented by the conditions of a machine in an accumulative, carry transfer scheme of notation comprising:
means to observe the significance represented by the conditions of a machine of at least one quotient ordinal higher than a lower, quotient ordinal being generated,
means to observe the significance of at least one ordinal of said dividend, and
means responsive to both said means to observe to generate a condition representative of the significance of said lower ordinal of said quotient.

2. The combination as in claim 1 also comprising means to store said lower ordinal quotient significance and to repeat said observations and said generation for successive lower ordinals of said quotient and said dividend.

3. A divider as in claim 1 wherein said dividend is represented in a machine in natural binary notation.

4. A divider as in claim 3 also comprising means to store said lower ordinal quotient significance and to repeat said observations and said generation for successive lower ordinals of said quotient and said dividend.

5. A divider as in claim 3 wherein said dividend is divided by five,
and said means to observe at least one quotient ordinal observes the significance of the three quotient ordinals immediately higher than a quotient ordinal being generated,
and said means to observe at least one ordinal of said dividend observes the one dividend ordinal which is the same ordinal value as a quotient ordinal being generated and also observes the significance of the three dividend ordinals immediately higher than said one dividend ordinal,
and said means responsive to generate a lower ordinal of the quotient generates the significance of the one quotient ordinal which is immediately lower in ordinal value than the lowest valued quotient ordinal observed.

6. A divider as in claim 5 also comprising means to store the significance of the said quotient ordinal generated and to repeat said observations and said generation for successive lower ordinals of said quotient and said dividend.

7. A divider as in claim 3 wherein said dividend is divided by three,
and said means to observe at least one quotient ordinal observes the significance of the two quotient ordinals immediately higher than a quotient ordinal being generated,
and said means to observe at least one ordinal of said dividend observes the one dividend ordinal which is the same ordinal value as a quotient ordinal being generated and also observes the significance of the two dividend ordinals immediately higher than said one dividend ordinal,
and said means responsive to generate a lower ordinal of the quotient generates the significance of the one quotient ordinal which is immediately lower in ordinal value than the lowest valued quotient ordinal observed.

8. A divider as in claim 7 also comprising means to store the significance of the said quotient ordinal generated and to repeat said observations and said generation for successive lower ordinals of said quotient and said dividend.

9. A divider as in claim 3 wherein said dividend is divided by seven,
and said means to observe at least one quotient ordinal observes the significance of the three quotient ordinals immediately higher than a quotient ordinal being generated,
and said means to observe at least one ordinal of said dividend observes the one dividend ordinal which is the same ordinal value as a quotient ordinal being generated and also observes the significance of the three dividend ordinals immediately higher than said one dividend ordinal,
and said means responsive to generate a lower ordinal of the quotient generates the significance of the one quotient ordinal which is immediately lower in ordinal value than the lowest valued quotient ordinal observed.

10. A divider as in claim 9 also comprising means to store the significance of the said quotient ordinal generated and to repeat said observations and said generation for successive lower ordinals of said quotient and said dividend.

11. A divider as in claim 3 wherein said dividend is divided by nine,
and said means to observe at least one quotient ordinal observes the significance of the four quotient ordinals immediately higher than a quotient ordinal being generated,
and said means to observe at least one ordinal of said dividend observes the one dividend ordinal which is the same ordinal value as a quotient ordinal being generated and also observes the significance of the four dividend ordinals immediately higher than said one dividend ordinal, and said means responsive to generate a lower ordinal of the quotient generates the significance of the one quotient ordinal which is immediately lower in ordinal value than the lowest valued quotient ordinal observed.

12. A divider as in claim 11 also comprising means to store the significance of the said quotient ordinal generated and to repeat said observations and said generation for successive lower ordinals of said quotient and said dividend.

13. A divider as in claim 2 in combination with other means adapted, in combination with said divider, to convert a number represented in a machine in one radix to another radix by successive divisions by the value of said other radix, at least one of said divisions being accomplished by said divider.

14. A divider as in claim 4 in combination with other means adapted, in combination with said divider, to convert a number represented in a machine in natural binary notation to another radix by successive divisions by the value of said other radix, at least one of said divisions being accomplished by said divider.

15. A divider as in claim 6 in combination with other means adapted, in combination with said divider, to convert a number represented in a machine in natural binary notation to a decimal notation by successive divisions by ten, at least one of said divisions being accomplished by said divider.

References Cited

UNITED STATES PATENTS 3,223,831 12/1965 Hollerman --------- 235—164

MALCOLM A. MORRISON, *Primary Examiner.*

V. SIBER, *Assistant Examiner.*